US008995305B2

(12) United States Patent
Shaik et al.

(10) Patent No.: US 8,995,305 B2
(45) Date of Patent: Mar. 31, 2015

(54) SY SESSION CREATION AND RECOVERING FROM INCONSISTENT SESSION STATE BETWEEN PCRF AND OCS

(75) Inventors: Shanawaz Shaik, Ottawa (CA); Kugendran Sabaratnam, Kanata (CA); Ivy Mao, Kanata (CA); Matthew Yee, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 121 days.

(21) Appl. No.: 13/598,271

(22) Filed: Aug. 29, 2012

(65) Prior Publication Data

US 2014/0064151 A1    Mar. 6, 2014

(51) Int. Cl.
*H04L 12/16* (2006.01)
*H04L 12/14* (2006.01)
*H04M 15/00* (2006.01)

(52) U.S. Cl.
CPC ........... *H04M 15/64* (2013.01); *H04L 12/1407* (2013.01); *H04L 12/1467* (2013.01); *H04M 15/66* (2013.01); *H04M 15/73* (2013.01); *H04M 15/8228* (2013.01); *H04M 15/83* (2013.01); *H04M 15/8355* (2013.01); *H04M 15/852* (2013.01)
USPC ........... 370/259; 370/252; 370/328; 370/329; 370/401; 455/405; 455/406; 455/407; 455/408; 455/409; 455/414.1; 455/450; 705/30; 705/34; 705/45; 705/400; 709/217; 709/219; 709/220; 709/223; 709/227; 709/228; 709/238

(58) Field of Classification Search
CPC ......... H04L 41/12; H04L 45/02; H04L 45/00; H04L 45/04; H04L 41/04; H04L 5/14; H04M 3/561; H04M 3/567
USPC ......... 370/254, 259, 265, 278, 252, 328, 329, 370/401; 455/405, 406, 407, 408, 409, 455/414.1, 450; 705/30, 34, 45, 400; 709/217, 219, 220, 223, 227, 228, 238
See application file for complete search history.

(56) References Cited

U.S. PATENT DOCUMENTS

| 8,195,783 | B2 * | 6/2012 | Crimi et al. | 709/223 |
| 2011/0067085 | A1 * | 3/2011 | Brouard et al. | 726/1 |
| 2012/0320801 | A1 * | 12/2012 | Yang et al. | 370/259 |
| 2013/0176908 | A1 * | 7/2013 | Baniel et al. | 370/259 |

FOREIGN PATENT DOCUMENTS

| WO | WO 2007139877 A1 * | 12/2007 | H04L 12/14 |
| WO | WO 2010049002 A1 * | 5/2010 | H04W 4/24 |
| WO | WO 2013110341 A1 * | 8/2013 | H04L 12/24 |

* cited by examiner

*Primary Examiner* — Un C Cho
*Assistant Examiner* — Natalin Pascual Peguero
(74) *Attorney, Agent, or Firm* — Kramer Amado P.C.

(57) ABSTRACT

Various exemplary embodiments relate to a method performed by a policy and charging rules node (PCRN), the method including: sending a first Sy spending limit request (SLR) to an online charging system (OCS) without specifying any policy counters; receiving from the OCS a first spending limit answer (SLA) including policy counters and associated status reports for a subscriber; creating an Sy session; determining required policy counters based upon the policy counter statuses; sending a second Sy SLR to the OCS for the required policy counters; and receiving a second SLA including status reports for the required policy counters.

20 Claims, 4 Drawing Sheets

SY SESSION CREATION AND RECOVERING FROM INCONSISTENT SESSION STATE BETWEEN PCRF AND OCS

TECHNICAL FIELD

Various exemplary embodiments disclosed herein relate generally to Sy session creation and recovering from inconsistent session state between a policy charging and rules function (PCRF) and online charging service (OCS).

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications, including the following components: Policy and Charging Rules Function (PCRF) implemented in a Policy and Charging Rules Node (PCRN); Policy and Charging Enforcement Function (PCEF) implemented in a Policy and Charging Enforcement Node (PCEN); and Bearer Binding and Event Reporting Function (BBERF) of the EPC. These specifications further provide some guidance as to how these elements interact in order to provide reliable data services and charge subscribers for use thereof.

Within these communication networks, metering may be used to measure usage of the communication network by subscribers. The PCRF may receive usage reports from the OCS. These usage reports may be used to create rules for controlling the usage of the communication network by the user. The OCS may provide various usage counters for a user. The PCRF may request which of these usage counters are reported. Further, an Sy session may be deleted, but the OCS may not receive such notification. In this situation, the OCS may send a usage report related to the deleted Sy session.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN), the method including: sending a first Sy spending limit request (SLR) to an online charging system (OCS) without specifying any policy counters; receiving from the OCS a first spending limit answer (SLA) including policy counters and associated status reports for a subscriber; creating an Sy session; determining required policy counters based upon the policy counter statuses; sending a second Sy SLR to the OCS for the required policy counters; and receiving a second SLA including status reports for the required policy counters.

Various exemplary embodiments relate to a method performed by a policy and charging rules node (PCRN), the method including: creating an Sy session; making a policy decision based upon policy counter statuses associated with the Sy session; receiving a message to terminate the Sy session; terminating the Sy session; receiving a first Sy message from an OCS relating to the terminated Sy session; and sending a second Sy message to the OCS including a result code indicating an unknown session ID.

Various exemplary embodiments relate to a method performed by a policy and charging rules node (PCRN), the method including: receiving a Gx CCR terminate message related to an Sy session; terminating the Sy session based upon the Gx CCR terminate message; receiving a status notification report (SNR) relating to the terminated Sy session; sending a status notification answer (SNA) indicating an unknown Sy session ID to the OCS.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
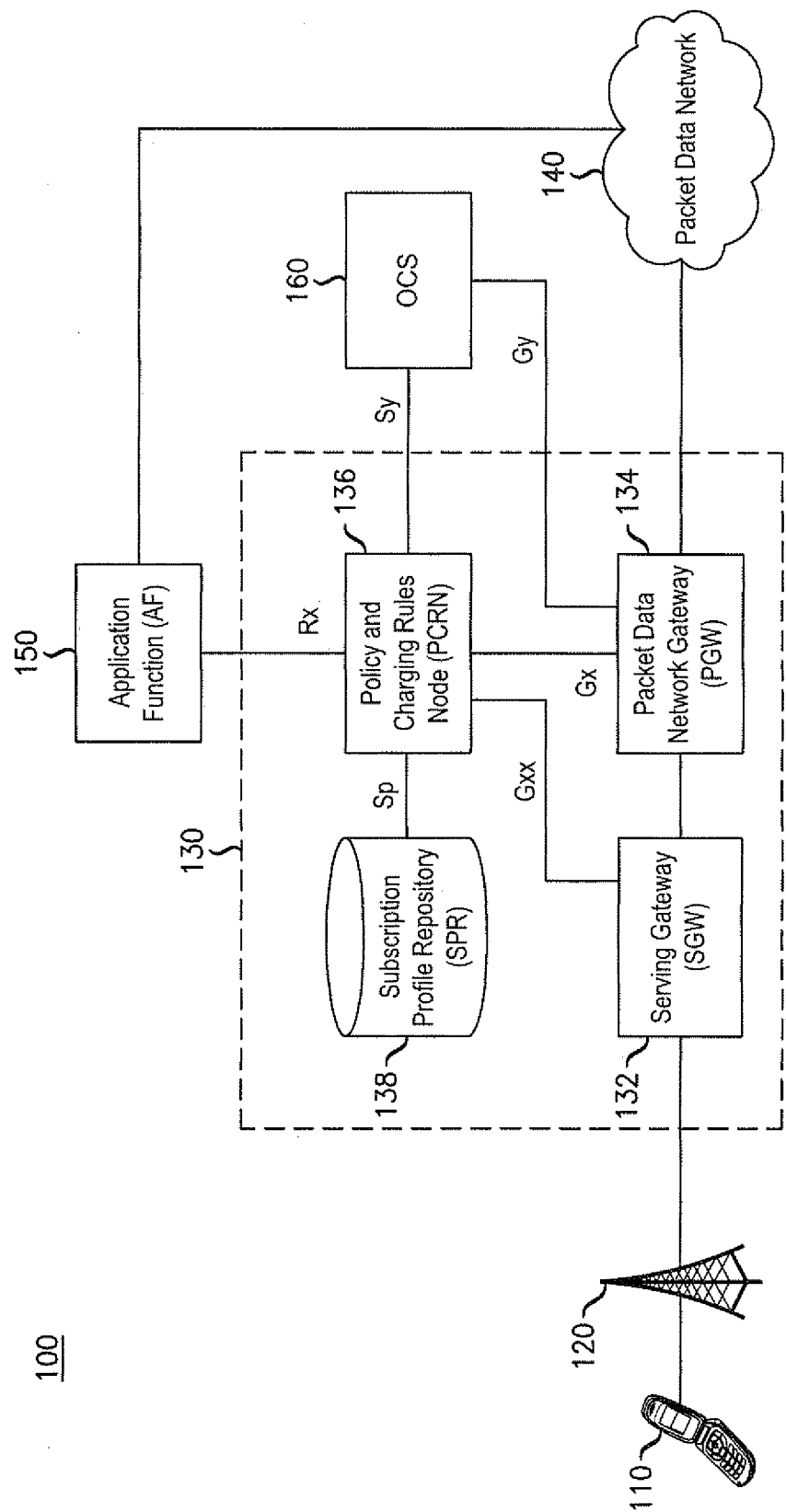
FIG. 1 illustrates an exemplary subscriber network for providing various data services.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, application function (AF) 150, and online charging system (OCS) 160.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to various 3GPP standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) from AF 150. Upon receipt of AAR 160, PCRN 136 may generate at least one new PCC rule for fulfilling the application request.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR, upon receipt of a CCR, PCRN may generate at least one new PCC rule for fulfilling the application request 170. In various embodiments, AAR and the CCR may represent two independent application requests to be processed separately, while in other embodiments, AAR and the CCR may carry information regarding a single application request and PCRN 136 may create at least one PCC rule based on the combination of AAR and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface. These QoS rules may be applied based upon usage information received from the OCS 160. When the OCS 160 indicates that certain usage thresholds have been reached, the PCRF 105 may change the QoS related to a subscriber and apply updated QoS rules to the PCEF 125.

The PCRN 136 may include network interfaces for communication with other network node, a PCC rule engine, and PCC rule storage. For example, the PCRN 136 may receive an OUT_OF_CREDIT trigger event via the network interface, and pass that event to the PCC rule engine for processing. The PCC rule engine may make decisions regarding existing rules and to create new rules based upon the trigger event. Any new rules or changes to rules may be noted in the PCC rule storage.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

OCS 160 may be used to track pre-paid usage of subscribers. For pre-paid usage charging occurs in real-time, where the service cost is deducted from the subscriber balance while the service is in operation. The OCS 160 may receive usage information from the PGW 134. Further the OCS 160 may install monitoring keys in the PGW 134 to monitor certain types of subscriber usage. The OCS 160 receives information related to usage limits associated with the subscriber. Further, the OCS 160 may receive threshold information based upon various desired usage thresholds. When a threshold is reached certain policies may become applicable. The OCS 160 may also communicate with the PCRN 136 via the Sy interface. The OCS 160 may send usage information to the PCRN 136. The OCS 160 may send indications when various thresholds have been exceeded such as for example an OUT_OF CREDIT event to the PGW 134, and the PGW 134 may then send an OUT_OF_CREDIT event trigger to the PCRN 136.

Typically a pre-paid subscriber of the subscriber network 100 may have a metering limit that defines a limit on the amount of resources that the subscriber may use. For example, a subscriber may have purchased 100 minutes, 500 MB of data, and 100 SMS messages. Other usage may be metered as well. Usage may also be measured based upon time of day or week. The OCS 160 may report usage to the PCRN 136 using a status notification report (SNR) message. The SNR may be sent whenever there is a change in the status of a usage counter.

Upon initiation of a user session, the PCRN 136 may send an initial request to the OCS to subscribe to notification regarding various usage counters. This request is made via an Sy spending limit request (SLR) message. It is possible that some of the requested usage counters may not be initialized. In this situation the OCS will not create an Sy session and will send an spending limit answer (SLA) message indicating an error and which usage counters are invalid. In this situation, the PCRN 136 then has to resend the SLR to the OCS 160, omitting the invalid usage counters. This may delay the creation of PCC QoS rules, and as a result, this delay may lead to errors because no policies are pushed to the PCEN.

A solution to this problem is to send an initial SLR without specifying any usage counters. This will cause the Sy session to be created in the OCS 160, and the OCS 160 will send the status of all available usage counters applicable to the user to the PCRN 136. Then the PCRN 136 may then send an intermediate SLR to indicate the specific usage counters for which status is requested. This approach may ensure that the initial Gx attach response to the PCEN 134 is not delayed, and overcomes the need for the PCRN 136 to resend the SLR to the OCS 160 when there is an error due to requesting an invalid usage counter.

Figure 2:
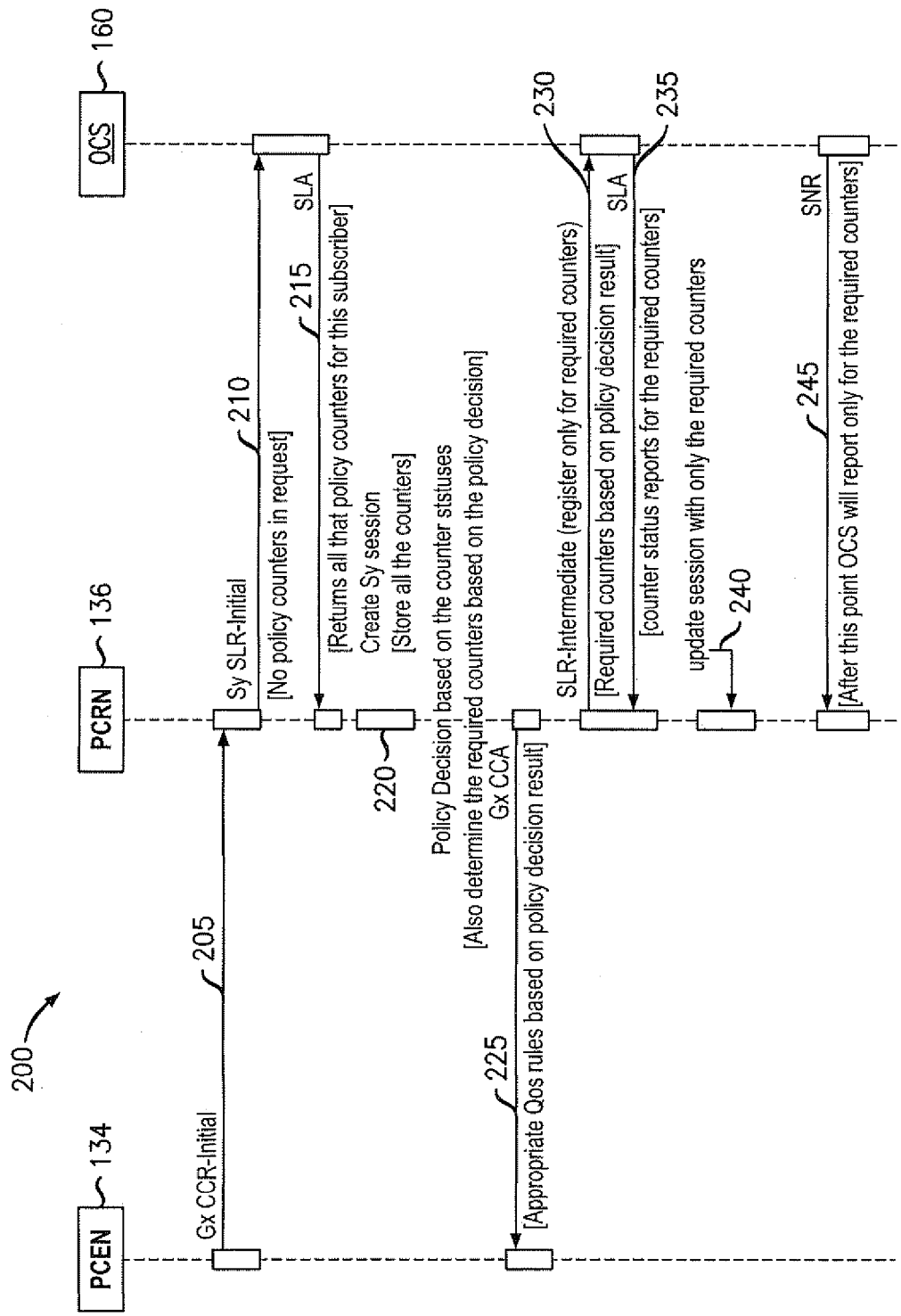
FIG. 2 illustrates an exchange of messages between a PCEN, PCRN, and OCS used to establish the policy counters used by the PCRN and the PCEN.

FIG. 2 illustrates an exchange of messages between a PCEN 134, PCRN 136, and OCS 160 used to establish the policy counters used by the PCRN 136 and the PCEN 134. The PCEN 134 may send 205 an application request in the form of a CCR to the PCRN 136. The CCR may lead to the PCRN 136 generating a rule in response to the application request. The generation of some rules may require usage status. Accordingly, the PCRN 136 may send 210 an initial Sy SLR message to the OCS 160. This SLR message may not include a request for any specific usage counters. In response, the OCS 160 may send an SLA back to the PCRN 160 that includes all of the usage counters for the user 215.

After receiving the usage counters, the PCRN 136 may create an Sy session 220. Also, the PCRN 134 may make a policy decision based upon the usage counters that may be implemented in specific rules such as PCC QoS rules. Further, the PCRN 136 may determine the needed usage counters based upon the policy decision or other factors. Next, the PCRN 136 may send a CCA message to the PCEN 134 to install QoS rules based upon the policy decision 225. The PCRN 134 may then send an intermediate SLR message to the OCS 160 to register for only the required usage counters 230. Upon receipt of the intermediate SLR message, the OCS 160 may send an SLA message including usage counter status reports for the requested usage counters 235. The PCRN 134 may then update the user session with usage counter information from the SLA message 240. Finally, the OCS 160 may send periodic SNR messages when any of the requested usage counters has a change in status 245.

As a result of this message exchange, the PCRN 136 may receive all of the available usage counters when a user session is established, thus preventing a delay in the establishment of the user session. This reduces the possibility of errors due to a delay in the establishment of the user session.

Another problem that may arise on the Sy interface between the PCRN 134 and the OCS 160 occurs when the PCRN 134 and OCS 160 are in inconsistent states. If there is not an Sy session on the OCS 160, when the PCRN 134 sends an SLR to the OCS 160 that is not an initial request (i.e., the SL-Request-Type AVP is not set to the value of INITIAL_REQUEST(0)), the OCS 160 will return a response with the Result-Code AVP set to DIAMETER_UNKNOWN_SESSION_ID.

On the other hand, the Sy interface specification does not specify how to handle the situation where an SNR sent by the OCS 160 to the PCRN 136 and there is no corresponding Sy session on the PCRN 136. Such a situation could arise when the OCS 160 fails to receive an session termination request (STR) sent by the PCRN 136 ending the Sy session. The following description of a message exchange between the PCEN 134, PCRN 136, and the OCS 160 describes an embodiment of how such a situation may be handled.

Figure 3:
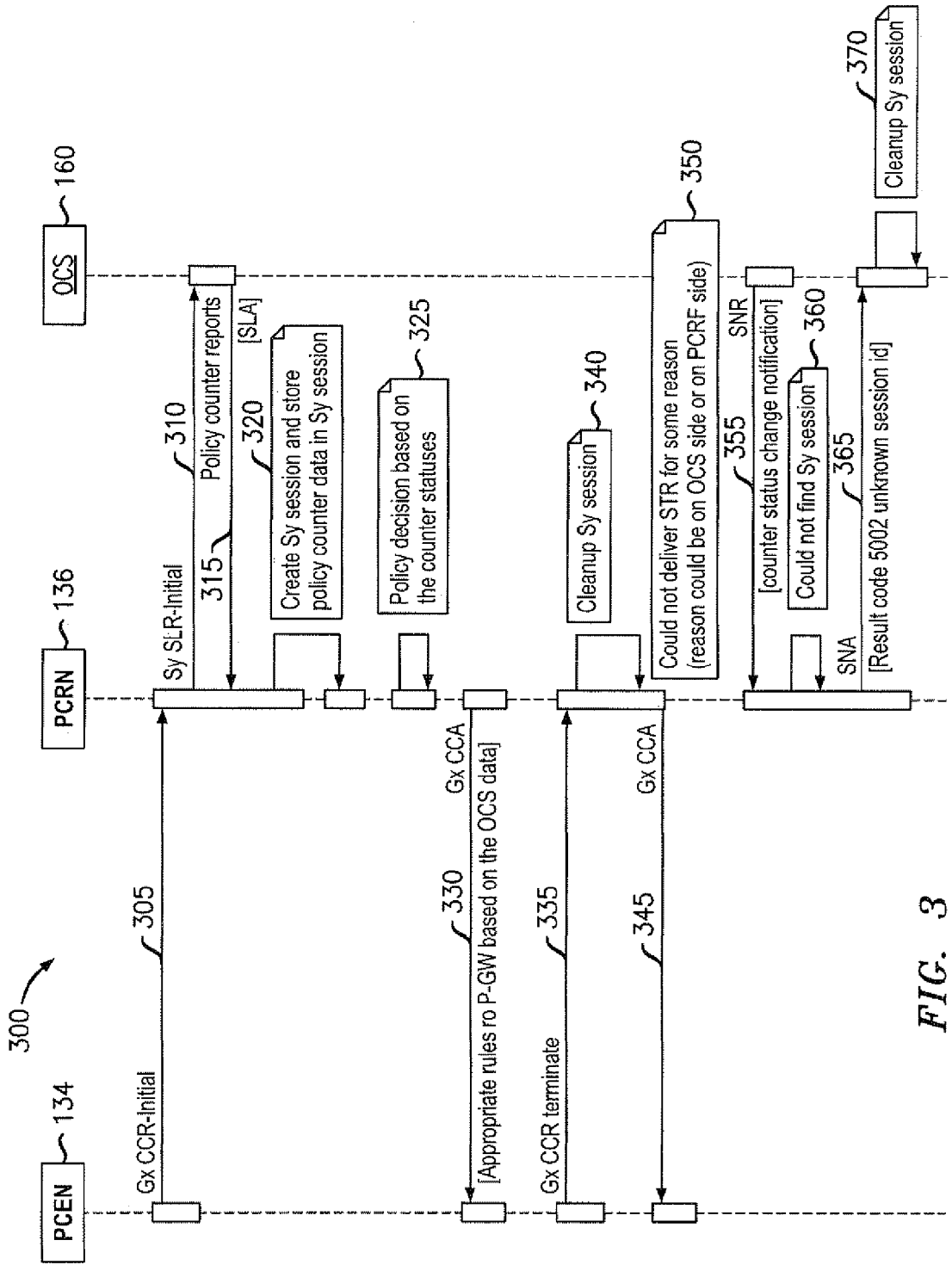
FIG. 3 illustrates an exchange of messages between a PCEN, PCRN, and OCS used to recover from an inconsistent state between the PCRN and the OCS.

FIG. 3 illustrates an exchange of messages between a PCEN, PCRN, and OCS used to recover from an inconsistent state between the PCRN and the OCS. First, the PCEN 134 may send an initial CCR to the PCRN 136 over the Gx interface to initiate a user session 305. Next, the PCRN 136 may send an initial SLR message 310 to the OCS 160. The OCS 160 may reply with an SLA that includes policy counter reports 315. Upon receipt of the SLA, the PCRN 136 may create an Sy session 320. Next, the PCRN 136 may make a policy decision based upon the counter statuses 325. The PCRN 136 then may send a CCA to the PCEN 134 including rules based on the OCS counter data 330. At some point in the future the PCEN 134 may send a CCR to terminate the user session 335. The PCRN 136 may then clean up the Sy session associated with the user session 340. Further, the PCRN 136 may send a CCA message to the PCEN 134 in response to the CCR terminate message 345. At this time, the PCRN 136 would also send an STR message to the OCS 160 to terminate the Sy session associated with the user session, but for some reason the STR is never received by the OCS 160. The OCS 160 may then send an SNR to the PCRN 134 indicating a status change of the policy counters 355. Because the PCRN 134 previously had deleted the user session and its associated Sy session, the PCRN cannot find an Sy session associated with the SNR 360. The PCRN 134 may then send a SNA with a result code indicating that the session ID is unknown 365. The OCS 160 upon receipt of the SNA message may clean up the Sy session 370.

Accordingly, when the OCS fails to delete a terminated Sy session for any reason, this session may be deleted as shown in FIG. 3. Specifically, when the OCS 160 sends an SNR to the PCRN 134 that the PCRN 134 does not recognize, the PCRN sends a result code indicating an unknown session ID, and the OCS 160 will then cleanup and delete the Sy session. This allows for PCRN 134 and OCS 160 to handle the situation when the PCRN 134 and OCS 160 are in consistent states.

As described above, subscriber usage counters may be maintained on the OCS 160. The PCRN 134 may subscribe to notifications of counter status changes at the OCS 160 by receiving an SLR diameter message from the OCS 160. The OCS 160 may send, in response to the SLA, policy counter reports to PCRN 134, and then whenever there is a change in the policy counter status, OCS 160 may send this information in a SNR to PCRF.

The Sy specification does not specify where to store the policy counter reports received from OCS at the PCRN 134. This is important because data should be in synch between the OCS 160 and PCRN 134, otherwise incorrect policies may get pushed to PCEN 136.

In an embodiment described below, the PCRN 134 may store this policy counter data on in an Sy Session. The Sy session may be created during the first IPCan session attach request from a PCEN 136 for that subscriber, and receive counters may be stored in the Sy session. The Sy session may be deleted when the last IPCan session for that subscriber gets terminated, and the PCRN 134 may send an STR to OCS 160 when the Sy session on the PCRN 134 is deleted. This will ensure that OCS policy counters are maintained on the PCRN 134 only if at least one IPCan session is active for that subscriber, will ensure that the PCRN 134 will not have any stale policy counter information, and also will ensure that invalid policies will not be sent to PCEN 136 based on the policy counter information.

This may also avoid a few intermediate requests to OCS 160 to get the latest data, as this ensures that data exists only for that Sy session. A new Sy session may fetch the latest data from OCS 160.

Figure 4:
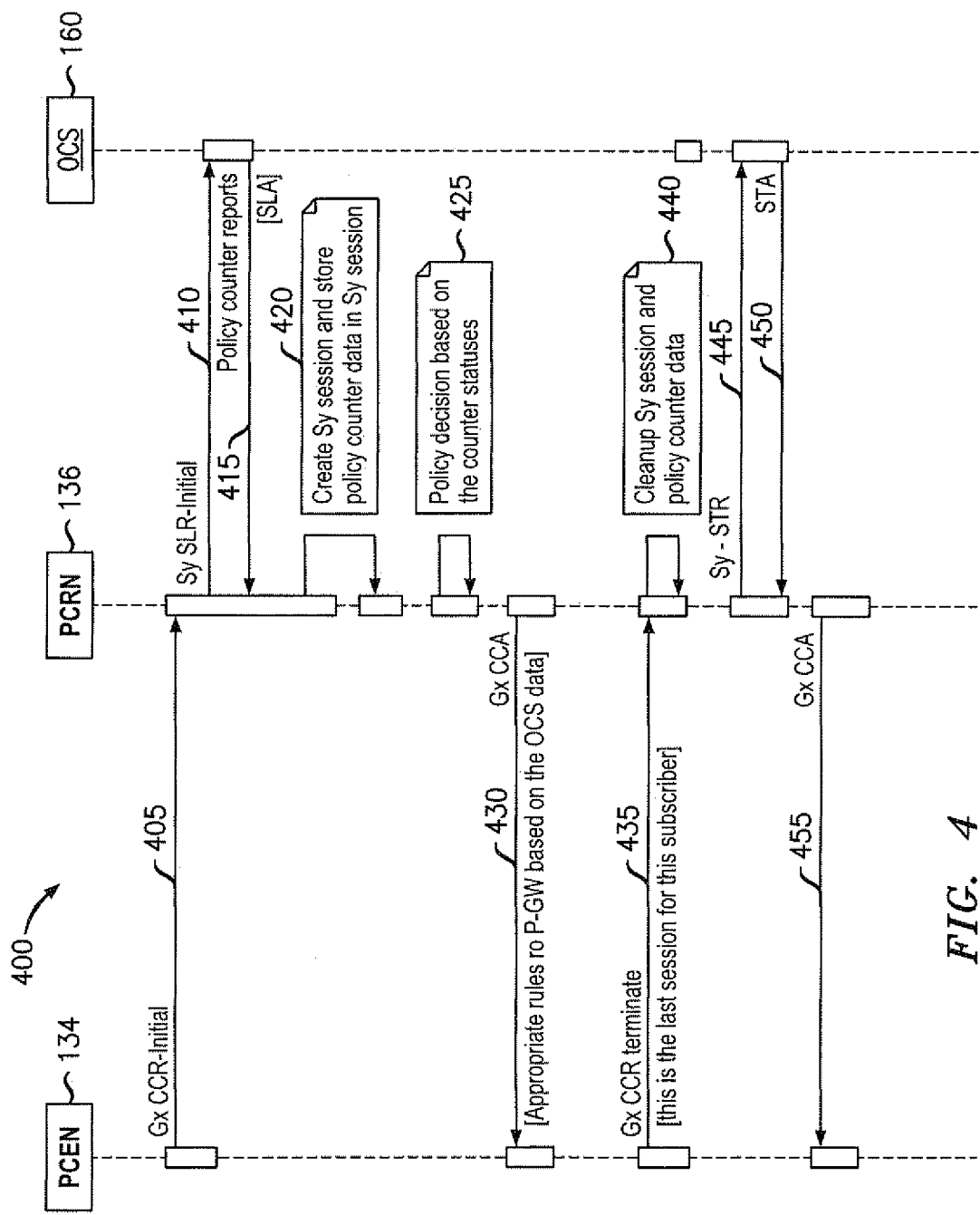
FIG. 4 illustrates an exchange of messages between a PCEN, PCRN, and OCS used to store policy counter data in an Sy session.

FIG. 4 illustrates an exchange of messages between a PCEN, PCRN, and OCS used to store policy counter data in an Sy session. First, the PCEN 134 may send an initial CCR to the PCRN 136 over the Gx interface to initiate a user session 405. Next, the PCRN 136 may send an initial SLR message 410 to the OCS 160. The OCS 160 may reply with an SLA that includes policy counter reports 415. Upon receipt of the SLA, the PCRN 136 may create an Sy session 420. Also, the policy counter day may be stored in the Sy session. Next, the PCRN 136 may make a policy decision based upon the counter statuses 425. The PCRN 136 then may send a CCA to the PCEN 134 including rules based on the OCS counter data 430. At some point in the future the PCEN 134 may send a CCR to terminate the user session 435. The PCRN 136 may then clean up the Sy session associated with the user session 440. Further, the policy counter data stored in the Sy session may be deleted. At this time, the PCRN 136 may also send an STR message to the OCS 160 to terminate the Sy session associated with the user session 445. The OCS 160 may then send a session termination answer (STA) to the PCRN 134 indicating the deletion of the Sy session 450. Further, the PCRN 136 may send a CCA message to the PCEN 134 in response to the CCR terminate message 455.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN), the method comprising:
sending a first Sy spending limit request (SLR) to an online charging system (OCS) without specifying any policy counters;
receiving from the OCS a first spending limit answer (SLA) including policy counters and associated status reports for a subscriber;
creating an Sy session;
determining required policy counters based upon the policy counter statuses;
sending a second Sy SLR to the OCS for the required policy counters; and
receiving a second SLA including status reports for the required policy counters.

2. The method of claim 1, further comprising:
making a policy decision based upon status reports for the required policy counters;
receiving a message to terminate the Sy session;
terminating the Sy session;
receiving an Sy message from an OCS relating to the terminated Sy session; and
sending an Sy message to the OCS including a result code indicating an unknown session ID.

3. The method of claim 1, further comprising updating the Sy session based upon the status reports in the second SLA.

4. The method of claim 1, further comprising receiving a third SLA message including status reports for the required policy counters.

5. The method of claim 1, further comprising making a first policy decision based upon the status reports in the first SLA.

6. The method of claim 5, further comprising sending quality of service (PCC) rules to a PCEN based upon the first policy decision.

7. The method of claim 6, further comprising making a second policy decision based upon the status reports in the second SLA.

8. The method of claim 7, further comprising sending quality of service (PCC) rules to a PCEN based upon the second policy decision.

9. A non-transitory program storage device readable by a machine, tangibly embodying a program of instructions executable by the machine to perform method steps of claim 1.

10. A method performed by a policy and charging rules node (PCRN), the method comprising:
    creating an Sy session;
    making a policy decision based upon policy counter statuses associated with the Sy session;
    receiving a message to terminate the Sy session;
    terminating the Sy session;
    receiving a first Sy message from an OCS relating to the terminated Sy session; and
    sending a second Sy message to the OCS including a result code indicating an unknown session ID.

11. The method of claim 10, further comprising sending quality of service (PCC) rules to a PCEN based upon the policy decision.

12. The PCRN of claim 10, wherein the OCS terminates an OCS Sy session based upon the second Sy message.

13. The PCRN of claim 10, wherein the first Sy message is not delivered to the OCS.

14. A non-transitory program storage device readable by a machine, tangibly embodying a program of instructions executable by the machine to perform method steps of claim 10.

15. The method performed by a policy and charging rules node (PCRN), the method comprising:
    receiving a Gx CCR terminate message related to an Sy session;
    terminating the Sy session based upon the Gx CCR terminate message;
    receiving a status notification report (SNR) relating to the terminated Sy session;
    sending a status notification answer (SNA) indicating an unknown Sy session ID to the OCS.

16. The PCRN of claim 15, wherein the OCS terminates an OCS session based upon the SNA.

17. The PCRN of claim 15, wherein an STR is not delivered to the OCS.

18. The PCRN of claim 15, further comprising making a policy decision based upon policy counter statuses associated with the Sy session.

19. The method of claim 18, further comprising sending quality of service (QPCC) rules to a PCEN based upon the policy decision.

20. A non-transitory program storage device readable by a machine, tangibly embodying a program of instructions executable by the machine to perform method steps of claim 15.

* * * * *